US006869356B2

(12) United States Patent
Hinds

(10) Patent No.: US 6,869,356 B2
(45) Date of Patent: Mar. 22, 2005

(54) CLEANING CHAMBER AND METHOD FOR A SUGARCANE CHOPPER HARVESTER

(75) Inventor: Michael Lynn Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/434,389

(22) Filed: May 8, 2003

(65) Prior Publication Data

US 2004/0224735 A1    Nov. 11, 2004

(51) Int. Cl.[7] .............................................. A01F 12/10
(52) U.S. Cl. ..................................................... 460/70
(58) Field of Search .............................. 56/12.8, 16.5, 56/13.3, 16.4 R, 51, 71; 460/70, 99, 100, 460/103, 111, 114, 119, 901

(56) References Cited

U.S. PATENT DOCUMENTS

| | | | | |
|---|---|---|---|---|
| 3,788,048 A | * | 1/1974 | Stiff et al. .................... 55/406 |
| 3,830,046 A | * | 8/1974 | Rollitt ......................... 56/16.5 |
| 3,925,199 A | * | 12/1975 | Quick ........................... 209/3 |
| 3,937,318 A | * | 2/1976 | Luxford ...................... 198/410 |
| 3,958,397 A | * | 5/1976 | Stiff ............................ 56/10.3 |
| 4,555,896 A | * | 12/1985 | Stiff et al. .................... 56/13.9 |
| 4,702,423 A | * | 10/1987 | Cerveira de Mello Ribeiro Pinto ............... 241/60 |
| 4,924,662 A | * | 5/1990 | Quick .......................... 56/12.8 |
| 5,092,110 A | | 3/1992 | Dommert et al. ............. 56/12.8 |
| 5,760,333 A | * | 6/1998 | Kitahara et al. ............. 174/16.3 |
| 6,062,009 A | * | 5/2000 | Caillouet ...................... 56/12.8 |
| 6,073,305 A | * | 6/2000 | Hesskamp .................... 15/405 |
| 6,272,819 B1 | * | 8/2001 | Wendte et al. ............... 58/11.9 |
| 6,458,030 B2 | * | 10/2002 | Visagie ........................ 460/45 |

FOREIGN PATENT DOCUMENTS

KR        2003013042 A  *  2/2003

* cited by examiner

*Primary Examiner*—Thomas B. Will
*Assistant Examiner*—Alicia Torres

(57) ABSTRACT

A sugarcane chopper harvester is equipped with a cleaning chamber for cleaning extraneous leafy matter and dirt from harvested and chopped cane delivered to the chamber. Located within the chamber is an axial flow fan for effecting an upward flow of air including a high-velocity, outer, ring-shaped upwardly flowing air stream. Mounted to the bottom of the axial flow fan is a blower wheel for creating an upwardly and outwardly flowing air stream beneath the center of the axial flow fan such that leafy matter and dirt passing into the middle of the cleaning chamber below the axial flow fan is caused to be directed outwardly to the high-velocity, ring-shaped stream of air.

5 Claims, 2 Drawing Sheets

CLEANING CHAMBER AND METHOD FOR A SUGARCANE CHOPPER HARVESTER

FIELD OF THE INVENTION

The present invention relates to sugarcane harvesters, and more specifically relates to a cleaning chamber and method for cleaning extraneous leafy material and dirt from the chopped cane of a chopper harvester.

BACKGROUND OF THE INVENTION

Sugarcane chopper harvesters use airflow devices to generate a flow of air to separate the extraneous matter, such as leaves and dirt from the chopped sugarcane, and expel it from the flow of chopped cane. This separation occurs in what is known as a cleaning chamber.

The most popular type of cleaning chamber has an axial flow fan, referred to as an extractor, as the air-generating device. The fan is mounted above the flow of chopped material and the unwanted material passes through the fan itself. The shape of the cleaning chamber is round to match the shape of the fan. The material to be separated is introduced into the cleaning chamber from one side and usually within two feet of the fan. At this distance from the fan, the air velocity is highest at the tips of the blades with ever-decreasing velocity towards the fan's center. Most of the extraneous matter is removed as it travels through the highest velocity areas. This occurs when the material enters the chamber and again when it reaches the far side of the chamber.

The design of the fan itself is composed of a hub and a number of fan blades that attach to the hub. There are many designs of fans. Some have small hubs with long blades and others have large hubs with short blades. In either case, a dead zone area exists directly below the hub such that the area in the cleaning chamber directly below the hub has little air movement. The dead zone area can be quite a bit larger than the actual hub diameter in some cases. Where a multitude of fans attach to a small hub, an over-lapping or almost over-lapping of blades occurs. Very little air movement occurs in this over-lapped area and little if any extraneous matter is withdrawn through this area. As an example, a popular state of the art 57" tip diameter fan with four blades and an 11" hub diameter has an effective blade over-lap diameter of 24".

In recent years, in an attempt to liven the dead zone, nose cone-shaped devices have been added to the fan hub. The fan efficiency is increased by adding these devices such that the same amount of air can be moved at a slower fan RPM. These devices do help nullify the dead zone effect by decreasing the dead zone to a point; however, the largest percentage of leaf and extraneous trash is removed while it is moving through the outer-most high-speed annular ring of air. Once through the high-speed air area, an air speed is eventually encountered that is not sufficient enough to levitate the material, and no further cleaning is achieved until the material reaches the opposite side of the cleaning chamber and is subjected to the high-speed flow again.

The problem to be solved is that of keeping the material exposed to the high-velocity air located at the tips of the fan blades and/or to increase the airflow in the center of the fan.

SUMMARY OF THE INVENTION

According to the present invention, there is provided an improved fan structure.

An object of the invention is to provide an improved fan structure which creates airflow in the center of the cleaning chamber. This object is achieved by providing an axial flow fan in combination with a centrifugal blower attached to the downward side of the fan hub.

This and other objects will become apparent from a reading of the ensuing description together with the appended drawings.

DESCRIPTION OF THE PREFERRED EMBODIMENT

Figure 1:
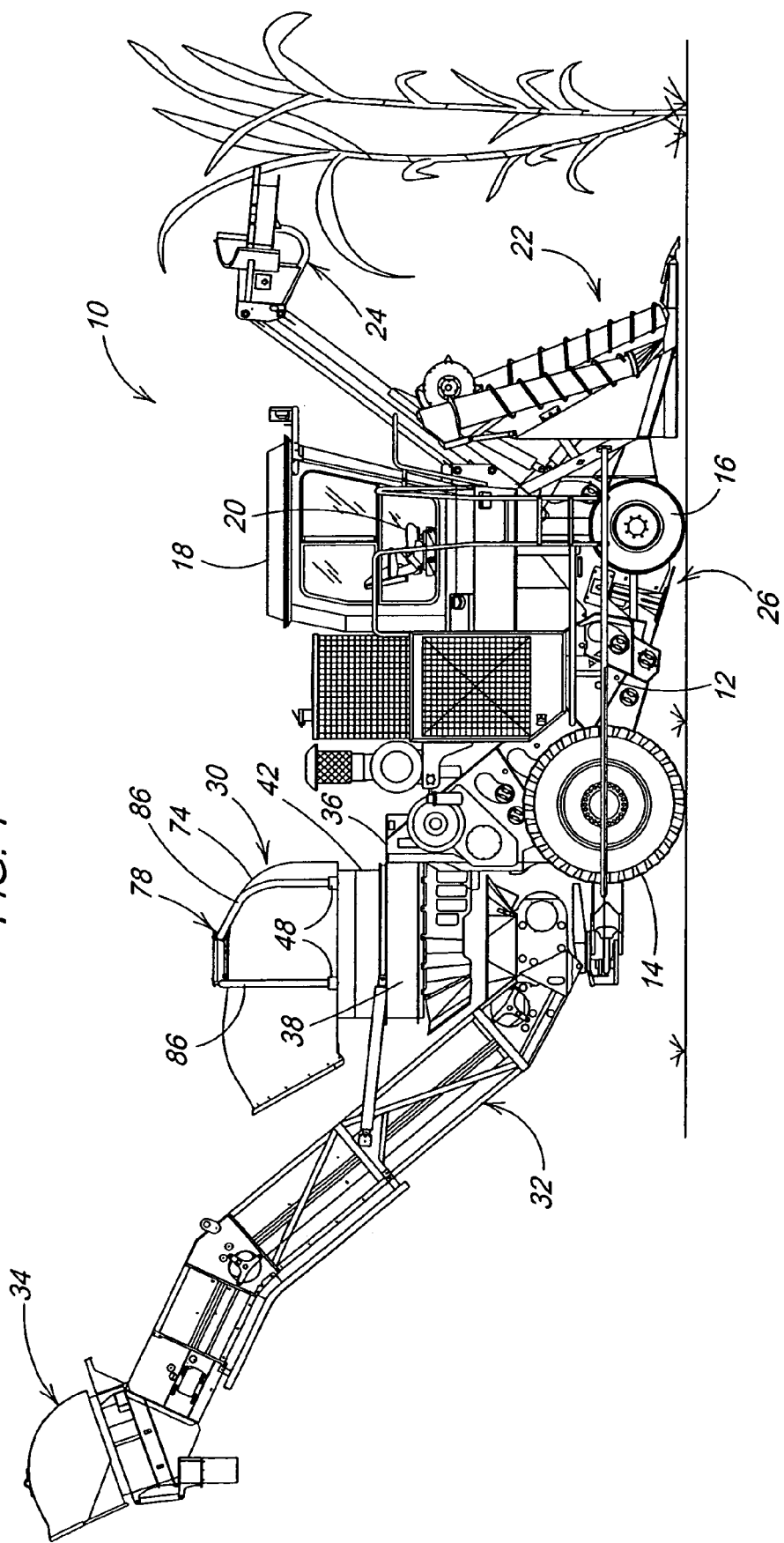
FIG. 1 is a schematic, right side elevational view of a sugarcane chopper harvester embodying a cleaning arrangement constructed in accordance with the present invention.

Referring now to FIG. 1, there is shown a sugarcane chopper harvester 10 including a main frame 12 supported on a pair of rear drive wheels 14 and a pair of steerable front wheels 16. An operator's cab 18 is mounted on a forward region of the frame 12 and contains a seat 20 from where an operator may view the operation of a pair of crop lifters 22, which would operate on opposite sides of a row of cane to be harvested, and the operation of a topper 24 mounted to the front of the frame 12. Located just to the rear of the front wheels 16 is a base cutter arrangement 26 including counter-rotating discs which cut off the stalks of cane close to the ground.

Figure 2:
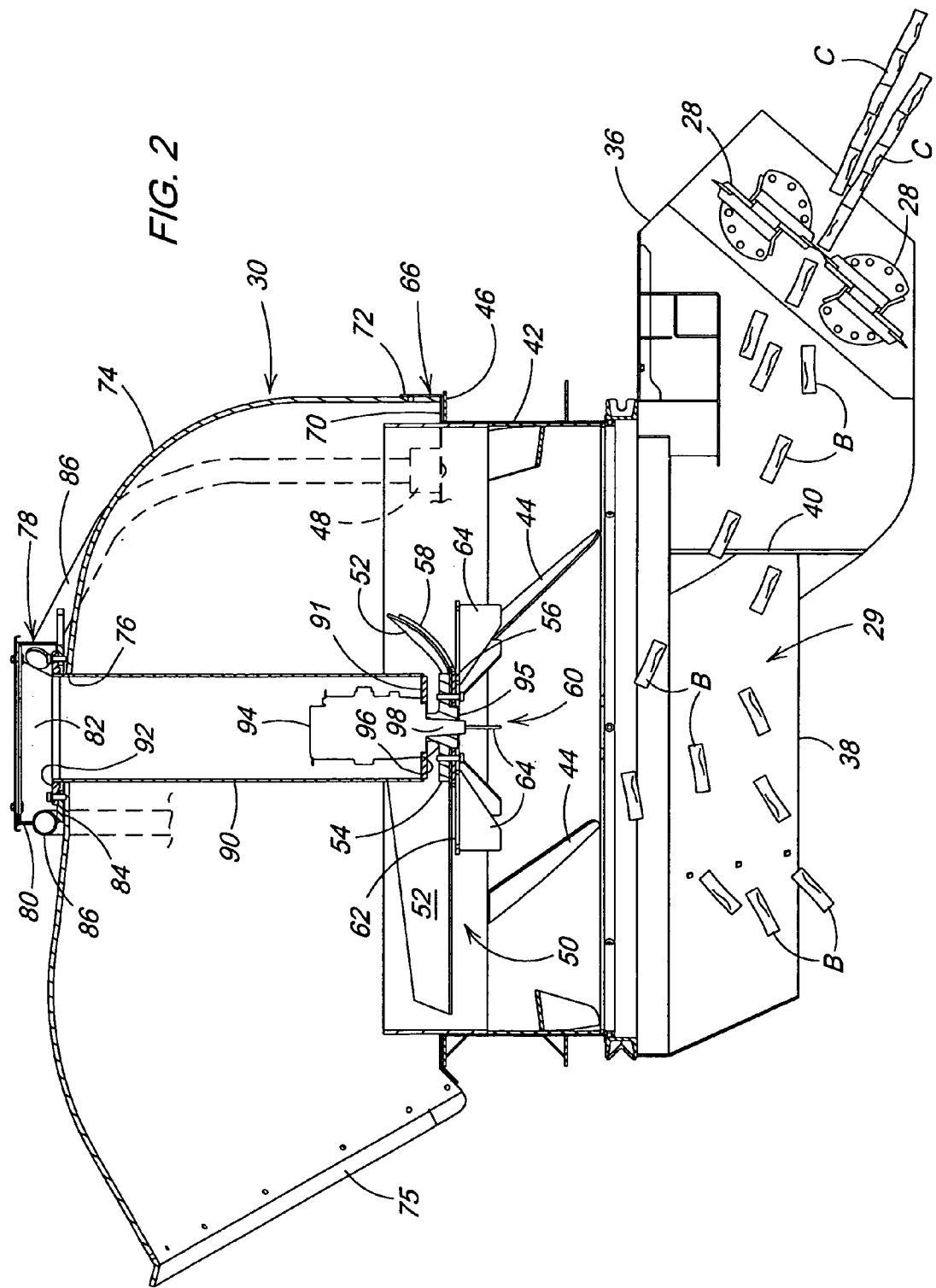
FIG. 2 is an enlarged vertical sectional view of the cleaning arrangement shown in FIG. 1.

Referring now also to FIG. 2, it can be seen that, once severed, stalks of cane C are conveyed rearwardly and upwardly to a further conveying device in the form of a chopper mechanism including counter-rotating drum cutters 28 having overlapping blades which operate to cut the stalks of cane C into billets B and eject them into a cleaning zone 29 of a primary cleaning chamber 30 where extraneous leaves and dirt are removed from the stream of billets B. The billets B fall onto a discharge conveyor 32 where they are conveyed past a secondary cleaning chamber 34 before being discharged into a truck or wagon or the like.

The primary cleaning chamber 30 includes a crop-receiving base 36 fixed to the frame 12 and including a major cylindrical wall section 38 partly surrounding the cleaning zone 29 and having a forward opening 40 through which a stream of crop including the billets B and extraneous leafy matter is introduced by the counter-rotating drum cutters 28. Mounted to the top of the crop-receiving base 36 is a cylindrical fan housing 42 having a plurality of deflector vanes 44 arranged at equally spaced locations around an interior lower section of its periphery. Fixed to an outer peripheral location of the fan housing 42 is a generally circular, hood-mounting flange 46 supporting four upwardly opening, cylindrical receptacles 48, for a purpose explained below.

Mounted for rotation in a zone just above that occupied by the deflector vanes 44 is an axial flow, primary extractor fan 50 including four equi-angularly spaced blades 52 radiating out from, and joined to, a lower surface of a central, circular hub 54. A reinforcing member 56 is secured to the bottom of the inner part of the fan 50 and includes four arms 58 respectively underlying and secured to the four blades 52.

Mounted for rotation with the fan 50 at a zone radially inwardly of the deflector vanes 46 is a centrifugal blower wheel 60 including a circular base plate 62 positioned against the bottom of the reinforcing member 56 and secured in place by a plurality of fasteners projecting upwardly through the base plate 62, reinforcing member 56, fan blades 52 and hub 54. Fixed to the underside of, and radiating out from the center of the base plate 62, are a plurality of generally right-angular blower blades 64, arranged and dimensioned such that their respective right angle corners terminate adjacent an outer edge of the base plate 62.

A hood mounting member 66 includes a central circular opening receiving the top section of the fan housing 42 and includes a horizontal bottom section 70 engaged with, and secured to, the hood mounting flange 46 by a plurality of fasteners. The mounting member 66 further includes a U-shaped flange 72 projecting upwardly from the bottom section 70. A domed hood 74 has a U-shaped bottom edge received inside the U-shaped flange 72 and secured thereto with a plurality of fasteners. A rear end of the hood 74 cooperates with the mounting member 66 to define a U-shaped discharge opening 75 through which leafy matter and dirt may be blown once removed from the stream of crop. Provided in the top of the hood 74 in axial alignment with the fan housing 42 is a circular opening 76 having a purpose explained below.

A motor supporting structure 78 is mounted over the hood 74 and includes a central support 80 defining a cylindrical recess 82 having a lower end terminating at a circular, horizontal support flange 84 disposed in axial alignment with the circular opening 76. Four tubular legs 86, shaped to conform generally to the exterior of the hood 74, extend outwardly from the central support 80 and then downwardly to the hood mounting flange 46 where lower ends of the legs 86 are respectively received in the receptacles 48 carried by the flange 46. A cylindrical motor housing 90, having a closed lower end 91 provided with a centrally located motor shaft opening and an upper end provided with a circular mounting flange 92, extends through the cylindrical recess 82 of the central support 80, and fasteners are used to secure the flange 92 against the support flange 84.

A hydraulic motor 94 is received within the housing 90 and includes a mounting base 96 positioned against, and secured to, the bottom 91 of the housing 90. The motor 96 includes a drive shaft 98 projecting through the motor shaft opening and received within a shaft receptacle provided in the middle of the fan hub 54. The shaft 98 is keyed, or otherwise fixed, to the hub 54.

In operation, a stream of cane billets B and extraneous leafy matter is delivered to the primary cleaning chamber 30 by the counter-rotating drum cutters 28. This stream of crop passes below the centrifugal blower wheel 60 which draws air vertically into its center and expels it horizontally to the outside of the wheel. This, in effect, creates air flow in the center of the cleaning chamber 30. The air flow into the center of the centrifugal blower wheel 60 is a swirling vortex shape. Any extraneous leafy matter or dirt coming into contact with it has the tendency to be thrown outwards. Thus, the crop mat passing through the cleaning chamber 30 will first go through the high velocity outer ring of air caused by the fan 50 and then strike the swirling vortex of air, which is somewhat like a tornado, caused by the blower wheel 60. This swirling vortex of air tends to expel the mat of crop back into the outer high velocity ring of air where most cleaning occurs. Any leafy matter or dirt passing through the vortex of air would have the tendency to be pulled straight up and expelled laterally by the blower wheel blades 64. The expelled leafy matter and dirt would be directed to the rear by the deflector vanes 44, in the direction of the discharge opening 75 defined by the hood 74 and mounting member 66. Thus, it will be appreciated that the blower wheel 60 acts to create air flow in what would normally be a dead zone beneath the center portion of the fan 50.

There is a further advantage which results from the lateral air flow caused by the blower wheel 60. Specifically, as leafy matter of the cane passes through the fan 50, there exists a good possibility that it will be struck by one or more of the fan blades 52. If the blades 52 are new, any leaf struck may be cut through. As the blades 52 become dull, the leaf has a tendency to hairpin over the front edge of the blades and ride there until being expelled by centrifugal force. This, in turn, causes even more blade wear. Eventually, the worn blades 52 must be replaced either due to breakage or insufficient air flow. However, due to air being exhausted laterally from the blower wheel 60, any cane leaf coming into the fan 50 oriented straight up and down, or at an angle, will have a tendency to be blown flat or parallel to the leading edges of the fan blades 52. This, of course, is the optimum orientation and will expose the leaf to the leading edges of the blades 52 the minimum amount of time, thus reducing fan blade wear.

Having described the preferred embodiment, it will become apparent that various modifications can be made without departing from the scope of the invention as defined in the accompanying claims.

What is claimed is:

1. A sugarcane chopper harvester, comprising: a conveyor arrangement for delivering a mixture of cane billets, extraneous leaves and dirt to a cleaning zone; a cleaning chamber including a major cylindrical bottom wall section at least partially surrounding said cleaning zone; a generally cylindrical fan housing joined to a top of said wall section, and said bottom wall section and said fan housing having a central upright axis; said fan housing having an axial flow fan mounted therein for rotation about said central axis of said housing; said fan having a plurality of blades fixed to, and radiating out from, a central hub; a centrifugal blower wheel mounted beneath and fixed to said fan for creating air flow in the center of the cleaning chamber in a zone beneath said hub; and a drive motor being coupled for effecting rotation of said fan and blower wheel.

2. The sugarcane chopper harvester, as defined in claim 1, wherein said cylindrical fan housing extends to a level below said fan; and a plurality of air deflecting vanes being fixed to an interior circumference of said fan housing at a location below said fan and radially outward of said blower wheel.

3. The sugarcane chopper harvester, as defined in claim 1, and further including an arched support structure having a cylindrical recess located centrally above said fan housing; a cylindrical tubular motor housing having an upper end located in said recess and fixed to said arched support structure; and said drive motor being mounted within said tubular motor housing.

4. The sugarcane chopper harvester, as defined in claim 3, wherein said cleaning chamber includes a domed hood positioned beneath said arched support.

5. A method of cleaning extraneous leafy matter and dirt from a stream of harvested and chopped cane stalks that are delivered to a cleaning chamber, comprising the steps of:
 a. creating a first air stream within said cleaning chamber which flows upwardly at a high velocity and is ring-shaped;
 b. simultaneously creating a second air stream, within said ring-shaped first air stream, which flows upwardly and then horizontally outwardly toward said first air stream; and
 c. delivering said stream of harvested and chopped cane stalks to said cleaning chamber at a location traversing said first air stream at a location below the horizontally flowing portion of said second air stream.

* * * * *